(12) United States Patent
Seo

(10) Patent No.: US 9,727,507 B2
(45) Date of Patent: Aug. 8, 2017

(54) USB DEVICE REMOTE CONTROL METHOD AND SYSTEM

(75) Inventor: Hyung Su Seo, Gyeonggi-do (KR)

(73) Assignee: RSUPPORT Co., Ltd., Seoul (KR)

( * ) Notice: Subject to any disclaimer, the term of this patent is extended or adjusted under 35 U.S.C. 154(b) by 432 days.

(21) Appl. No.: 13/544,827

(22) Filed: Jul. 9, 2012

(65) Prior Publication Data

US 2013/0013814 A1    Jan. 10, 2013

(30) Foreign Application Priority Data

Jul. 7, 2011  (KR) .................... 10-2011-0067320

(51) Int. Cl.
  *G06F 13/38* (2006.01)
(52) U.S. Cl.
  CPC ................. *G06F 13/385* (2013.01)
(58) Field of Classification Search
  None
  See application file for complete search history.

(56) References Cited

U.S. PATENT DOCUMENTS

| | | | |
|---|---|---|---|
| 6,601,129 B1 * | 7/2003 | Arakeri ............... | G06F 3/023 710/300 |
| 6,711,162 B1 * | 3/2004 | Ortega ................ | H04L 29/06 370/389 |
| 6,924,727 B2 | 8/2005 | Nagaoka et al. | |
| RE44,814 E * | 3/2014 | Perholtz .............. | 379/38 |
| 8,825,909 B1 * | 9/2014 | Delco ................. | G06F 9/4411 710/10 |
| 2004/0107025 A1 * | 6/2004 | Ransom ............. | G05B 19/4185 700/286 |
| 2005/0066000 A1 * | 3/2005 | Liaw ................. | G06F 13/385 709/204 |
| 2005/0132408 A1 * | 6/2005 | Dahley et al. ........... | 725/80 |
| 2005/0144251 A1 * | 6/2005 | Slate ................ | H04L 29/06 709/215 |
| 2006/0020732 A1 * | 1/2006 | Charna ............... | 710/303 |
| 2006/0095384 A1 * | 5/2006 | Ishii ................. | 705/64 |
| 2006/0195832 A1 * | 8/2006 | Chandley et al. ........ | 717/168 |
| 2007/0022176 A1 * | 1/2007 | Kobayashi ............ | H04L 12/12 709/217 |

(Continued)

FOREIGN PATENT DOCUMENTS

CN          101540699 A      9/2009

*Primary Examiner* — Henry Tsai
*Assistant Examiner* — Christopher Bartels
(74) *Attorney, Agent, or Firm* — Osha Liang LLP

(57) ABSTRACT

The USB device remote control method in a remote control system including a first device connected with a terminal through USB and a second device connected with the first device via a network includes installing, at the first device, a USB driver of the terminal, providing, at the first device, a remote terminal control module to the terminal using the USB driver, transmitting, at the second device, a control command for controlling the terminal to the first device and providing, at the first device, the control command to the terminal using the USB driver, executing, at the remote terminal control module, a command corresponding to the received control command and capturing and providing a display image showing the execution result to the first device through the USB driver, transmitting, at the first device, the display image to the second device.

10 Claims, 2 Drawing Sheets

(56) References Cited

U.S. PATENT DOCUMENTS

| | | | |
|---|---|---|---|
| 2007/0073937 A1* | 3/2007 | Feinberg | G06F 9/445 710/62 |
| 2007/0079008 A1* | 4/2007 | Leibovich et al. | 709/246 |
| 2007/0195167 A1* | 8/2007 | Ishiyama | 348/207.1 |
| 2007/0250623 A1* | 10/2007 | Hickey et al. | 709/224 |
| 2007/0300063 A1* | 12/2007 | Adams | G06F 21/35 713/168 |
| 2008/0010340 A1* | 1/2008 | Orady | G06F 3/14 709/203 |
| 2009/0024847 A1* | 1/2009 | Sun | G06F 21/6209 713/165 |
| 2010/0241772 A1 | 9/2010 | Kugimoto et al. | |
| 2010/0248681 A1* | 9/2010 | Phills | G08B 27/005 455/404.2 |
| 2011/0055834 A1* | 3/2011 | Meda et al. | 718/101 |
| 2011/0102588 A1* | 5/2011 | Trundle et al. | 348/143 |
| 2011/0113166 A1* | 5/2011 | Hung et al. | 710/63 |
| 2012/0092441 A1* | 4/2012 | Kong et al. | 348/14.08 |
| 2012/0236201 A1* | 9/2012 | Larsen et al. | 348/468 |
| 2013/0035143 A1* | 2/2013 | Izutsu | G06F 1/1632 455/566 |
| 2013/0170738 A1* | 7/2013 | Capuozzo et al. | 382/159 |
| 2013/0215266 A1* | 8/2013 | Trundle et al. | 348/143 |
| 2014/0270722 A1* | 9/2014 | Wang et al. | 386/355 |
| 2015/0339216 A1* | 11/2015 | Wade | G06F 11/3688 714/38.1 |

* cited by examiner

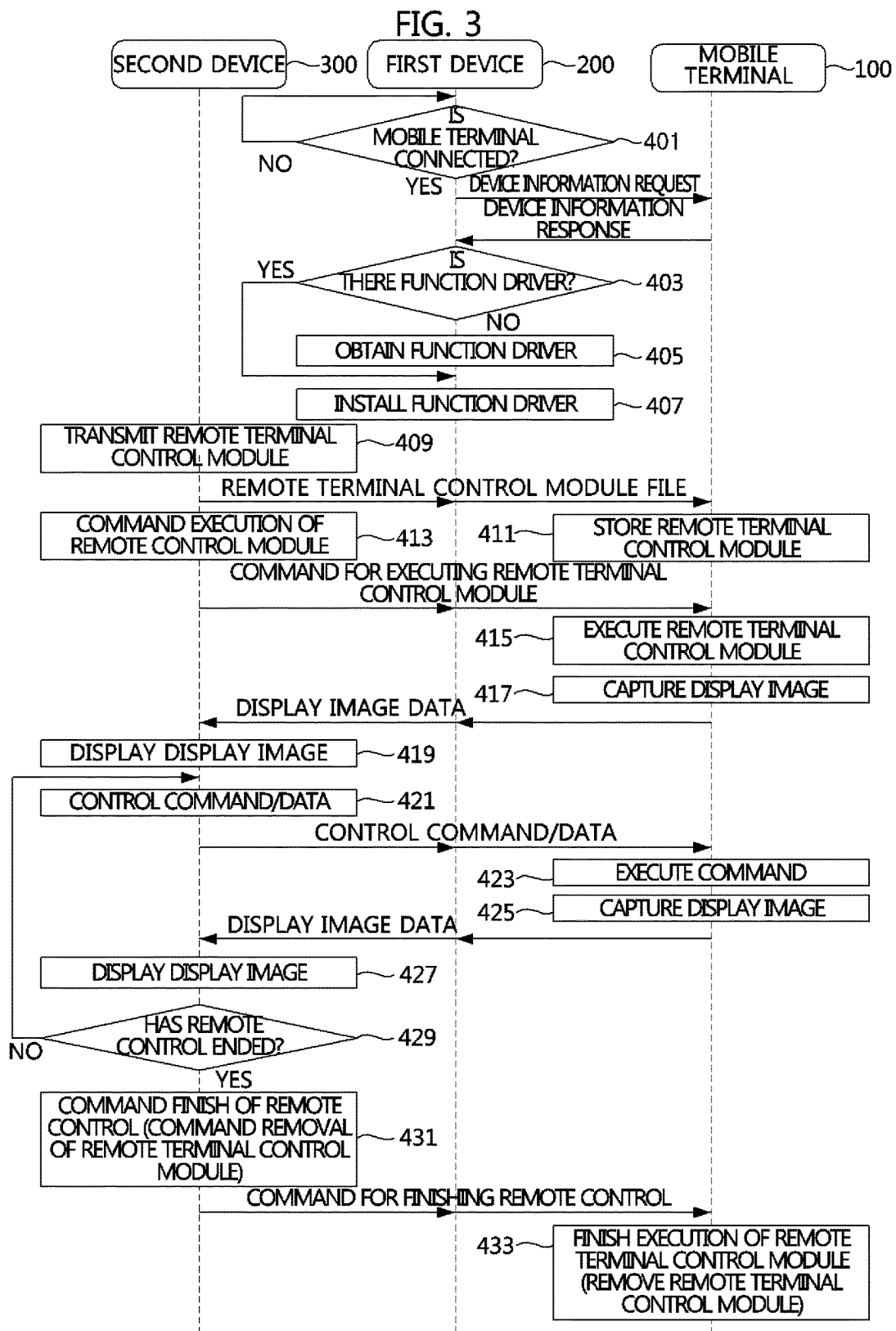

USB DEVICE REMOTE CONTROL METHOD AND SYSTEM

CLAIM FOR PRIORITY

This application claims priority to Korean Patent Application No. 10-2011-0067320 filed on Jul. 7, 2011 in the Korean Intellectual Property Office (KIPO), the entire contents of which are hereby incorporated by reference.

BACKGROUND OF INVENTION

1. Technical Field

Example embodiments of the present invention relate in general to remote control, and more particularly, to a Universal Serial Bus (USB) device remote control method that can be applied to remote control of a terminal connected to a specific device present at a remote location through USB and a system that performs the USB device remote control method.

2. Related Art

As the standard of input/output (I/O) interfaces connecting computers with peripherals, a USB interface has advantages such as ease of use, high-speed communication, high stability, generality, low implementation cost, low power consumption, and support for various operating systems (OSs).

Due to these advantages, the USB interface is being widely used as a connection means of digital cameras, external storage devices, mobile communication terminals, etc., as well as computer I/O devices, such as keyboards, mice, printers and scanners.

A computer and peripherals connected through the USB interface operate as a host and devices, respectively. A plurality of devices may be connected to one host.

Lately, with the development of processors, memory technology and communication technology, a mobile communication terminal having voice and video telephony functions, and also various functions such as still photography, moving picture photography, and Internet access has been commercialized, and the USB interface with excellent communication speed, convenience, generality and extendability is used as a communication means between a personal computer (PC) and a mobile communication terminal.

For example, when a user upgrades an OS or firmware installed on a mobile communication terminal, or installs, removes or updates an application in the mobile communication terminal while using the mobile communication terminal, the user should first connect the mobile communication terminal to a computer through the USB interface, and then perform a desired operation through the computer.

At this time, the device driver of the mobile communication terminal should be installed on the computer such that the computer can recognize the mobile communication terminal as a USB device and perform normal communication after the computer and the mobile communication terminal are physically connected through the USB interface.

Since it is practically impossible to include the device drivers of all mobile communication terminals currently on the market in the OS of a computer, a user of a mobile communication terminal should personally obtain and install a device driver provided by the manufacturer or a seller of the corresponding device on the computer. As mobile communication terminals become more functionally sophisticated, the process of installing a device driver on a computer is becoming more complicated.

However, most users do not accurately know the process of controlling a mobile communication terminal through a computer, thus causing inconvenience in use. Also, when the aforementioned process is incorrectly performed, there is a high probability that data stored in the mobile communication terminal will be deleted, or a serious error will occur.

Furthermore, since functions of a recent mobile communication terminal, such as a cellular phone, a smart phone or a pad-type terminal, are very complicated and advanced, there is a high probability of an error or failure occurring when the mobile communication terminal is used. When an error or failure occurs in such a mobile communication terminal, it is difficult for a common user with no expertise to find the cause of the error or failure, let alone correct it. Consequently, the user should request an expert or service center to diagnose and fix the trouble, resulting in inconvenience in use.

SUMMARY OF INVENTION

Accordingly, example embodiments of the present invention are provided to substantially obviate one or more problems due to limitations and disadvantages of the related art.

Example embodiments of the present invention provide a Universal Serial Bus (USB) device remote control method by which a terminal connected to a specific device at a remote location through USB can be remotely controlled.

Example embodiments of the present invention also provide a system performing the USB device remote control method.

In some example embodiments, a USB device remote control method in a remote control system including a first device connected with a terminal through USB and a second device connected with the first device via a network, includes: providing, at the first device, a remote terminal control module to the terminal using a USB driver; transmitting, at the second device, a control command for controlling the terminal to the first device, and providing, at the first device, the control command to the terminal using the USB driver; executing, at the remote terminal control module, a command corresponding to the received control command, and capturing and providing a display image showing the execution result to the first device through the USB driver; transmitting, at the first device, the display image to the second device; and displaying, at the second device, the display image.

Here, the USB device remote control method may further include installing, at the first device, the USB driver of the terminal. Installing the USB driver may include: after the first device is connected with the terminal through USB, determining, at the first device, whether or not there is a function driver of the terminal on the basis of device information provided from the terminal; when there is not the function driver of the terminal, accessing, at the first device, a specific server and downloading the function driver; and installing, at the first device, the downloaded function driver.

Here, the USB device remote control method may further include installing, at the first device, the USB driver of the terminal. Installing the USB driver may include: transmitting, at the first device, device information provided from the terminal to the second device via the network; transmitting, at the second device, a function driver of the terminal corresponding to the device information to the first device; and installing, at the first device, the function driver received from the second device.

Here, providing, at the first device, the remote terminal control module to the terminal using the USB driver may include: transmitting, at any one of the second device and a specific server, the remote terminal control module to the first device via the network; providing, at the first device, the remote terminal control module to the terminal through the USB driver, or providing, at the first device, a command for executing the remote terminal control module to the terminal; providing, at the second device, the command for executing the remote terminal control module to the terminal through the first device; executing, at the terminal, the remote terminal control module in response to the command for executing the remote terminal control module; and capturing, at the executed remote terminal control module, the display image displayed on the terminal and providing the captured display image to the second device through the first device.

Here, transmitting, at the first device, the display image to the second device may include: displaying, at the first device, the display image on the first device; capturing, at the first device, a display image of the first device in which the display image is shown; and providing, at the first device, the captured display image of the first device to the second device.

Here, displaying, at the second device, the display image may include displaying, at the second device, a received one of the display image and a display image of the first device.

Here, the USB device remote control method may further include, after displaying, at the second device, the display image: providing, at the second device, a command for finishing remote control of the terminal to the terminal through the first device; and finishing, at the terminal, execution of the remote terminal control module in response to the command for finishing remote control.

In other example embodiments, a USB device remote control system includes: a first remote control module installed in a first device connected with a terminal through USB, and configured to, when a function driver of the terminal is not in the first device, install the function driver according to a predetermined method and communicate with the terminal through the function driver; and a second remote control module installed in a second device connected with the first device via a network, and configured to transmit a command for controlling the terminal to the terminal through the first remote control module by performing communication with the first remote control module, receive a display image of the terminal through the first remote control module and display the received display image.

Here, the first remote control module may determine whether the function driver is in the first device on the basis of device information provided from the terminal, and access a specific server to download and install the function driver when the function driver is not in the first device.

Here, the first remote control module may determine whether the function driver is in the first device on the basis of device information provided from the terminal, and when the function driver is not in the first device, may transmit the device information to the second remote control module and install the function driver provided from the second remote control module.

Here, the second remote control module may transmit a remote terminal control module for remote control of the terminal to the first remote control module, and the first remote control module may provide the remote terminal control module to the terminal.

Here, the second remote control module may provide a command for executing the remote terminal control module stored in the terminal to the terminal through the first remote control module.

BRIEF DESCRIPTION OF DRAWINGS

Example embodiments of the present invention will become more apparent by describing in detail example embodiments of the present invention with reference to the accompanying drawings, in which:

FIG. 3 is a flowchart illustrating a USB device remote control method according to an example embodiment of the present invention.

DETAILED DESCRIPTION

Figure 1:
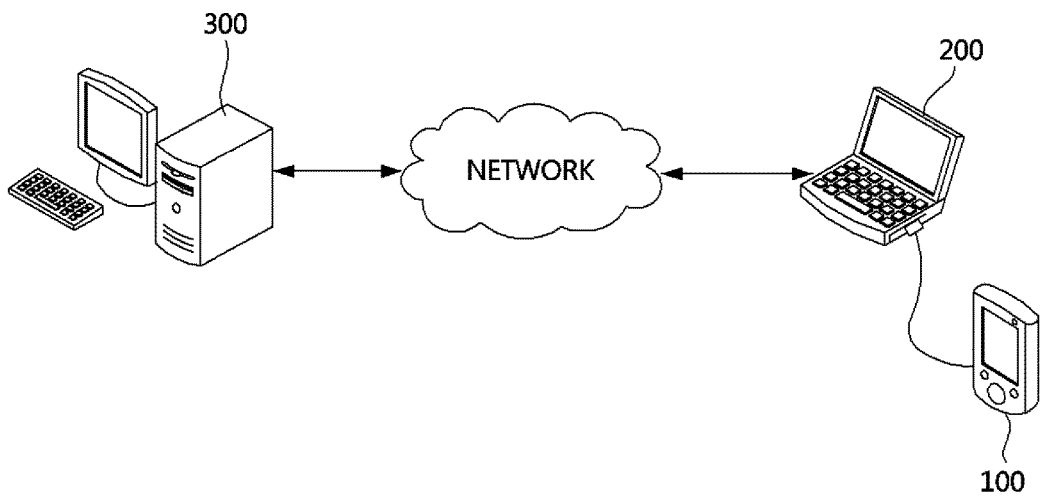
FIG. 1 is a conceptual diagram illustrating a Universal Serial Bus (USB) device remote control system according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. Like numbers refer to like elements throughout the description of the figures, and the description of the same component will not be reiterated.

FIG. 1 is a conceptual diagram illustrating a Universal Serial Bus (USB) device remote control system according to an example embodiment of the present invention.

Referring to FIG. 1, a remote control system according to an example embodiment of the present invention includes a mobile terminal 100, a first device 200 connected with the mobile terminal 100 through a USB interface, and a second device 300 that is at a remote location and connected with the first device 200 via a wired or wireless network.

The first device 200 and the second device 300 may be any devices such as computers capable of communicating with each other via a wired or wireless network and digital information processing. For example, the first device 200 may be a computer of a user in the house or office of the user, and the second device 300 may be a computer of a counselor in an after-sales service center providing after-sales service for the mobile terminal 100.

The mobile terminal 100 is a device that performs a function of a USB device, and may be, for example, a mobile communication terminal such as a smart phone, a cellular phone and a personal digital assistant (PDA), or various digital information processing terminals such as a portable multimedia player (PMP), a smart player and a pad-type terminal.

The mobile terminal 100 is physically connected with the first device 200 through a USB cable or wireless USB by the user, and may perform the corresponding operation in response to a direct request or command of the first device 200, or an operation corresponding to a request or command provided from the second device 300 via the network.

For example, after being physically connected with the first device 200 through the USB interface, the mobile terminal 100 may perform the corresponding command in response to a command provided from the first device 200. Also, in response to a command and/or data provided from the second device 300 via the network, the mobile terminal 100 may perform update of an operating system (OS) or firmware, or installation, update, removal, etc. of an application, and may capture and provide a display image showing the operation result directly to the first device 200 or to the second device 300 at the remote location through the first device 200.

The first device 200 functions as a physical host of the mobile terminal 100 connected through USB. Specifically, the first device 200 senses whether a mobile terminal is connected to a USB port. When it is determined that the mobile terminal 100 is connected, the first device 200 establishes a temporary communication path by setting a pipe capable of connecting an endpoint of the mobile terminal 100 with a host, and then requests device information (e.g., a device descriptor) from the mobile terminal 100.

When a response to the device information request is thereafter received from the mobile terminal 100, the first device 200 determines whether or not there is a function driver for driving the mobile terminal 100 on the basis of the received information (e.g., a vendor identification (ID) and a product ID). When there is the function driver, the first device 200 loads the function driver into a memory. On the other hand, when there is not the function driver, the first device 200 obtains the function driver using predetermined information and then installs the obtained function driver.

Here, when it is determined that the function driver of the mobile terminal 100 is not in the first device 200, the first device 200 may access a predetermined device driver server using predetermined address information (e.g., uniform resource locator (URL) information on the predetermined device driver server) to download and install the function driver, or may access a server of the corresponding manufacturer using the vendor ID and the product ID provided from the mobile terminal 100 to download and install the function driver. Alternatively, the first device 200 may be configured to transmit the device information (i.e., the vendor ID and the product ID) received from the mobile terminal 100 to the second device 300 via the network, receive the function driver from the second device 300, and install the function driver.

When the function driver of the mobile terminal 100 connected through USB is installed as described above, the first device 200 provides a command and/or data provided from the second device 300 connected via the network to the mobile terminal 100 through the installed function driver, and transmits data provided from the mobile terminal 100, such as the execution result data or a captured display image, to the second device 300 via the network. Here, the first device 200 may display the display image provided from the mobile terminal 100 on the first device 200 only without transmitting the display image to the second device 300, or transmit the display image of the mobile terminal 100 to the second device 300 via the network while displaying the display image. Also, the first device 200 may only perform a transfer function of transmitting the display image of the mobile terminal 100 to the second device 300 without directly displaying the display image, or may display the display image provided from the mobile terminal 100, capture a display image of the first device 200 including the displayed display image of the mobile terminal 100, and transmit the captured display image of the first device 200 to the second device 300 via the network. Alternatively, the mobile terminal 100 may be configured to directly transmit the captured display image of the mobile terminal 100 to the second device 300 using a mobile communication network, a wireless communication network, etc. separately from the first device 200.

The second device 300 transmits a command and/or data for removing the mobile terminal 100 to the first device 200 via the network, receives data transmitted from the first device 200, such as the execution result data or a captured display image of the mobile terminal 100, and then displays the received display image. Here, when a captured display image of the first device 200 including a display image of the mobile terminal 100 is transmitted from the first device 200, the second device 300 may display the captured display image of the first device 200. Alternatively, when a captured display image of the mobile terminal 100 is directly transmitted from the mobile terminal 100 via the mobile communication network, the wireless communication network, etc., the second device 300 may receive and display the captured display image.

Figure 2:
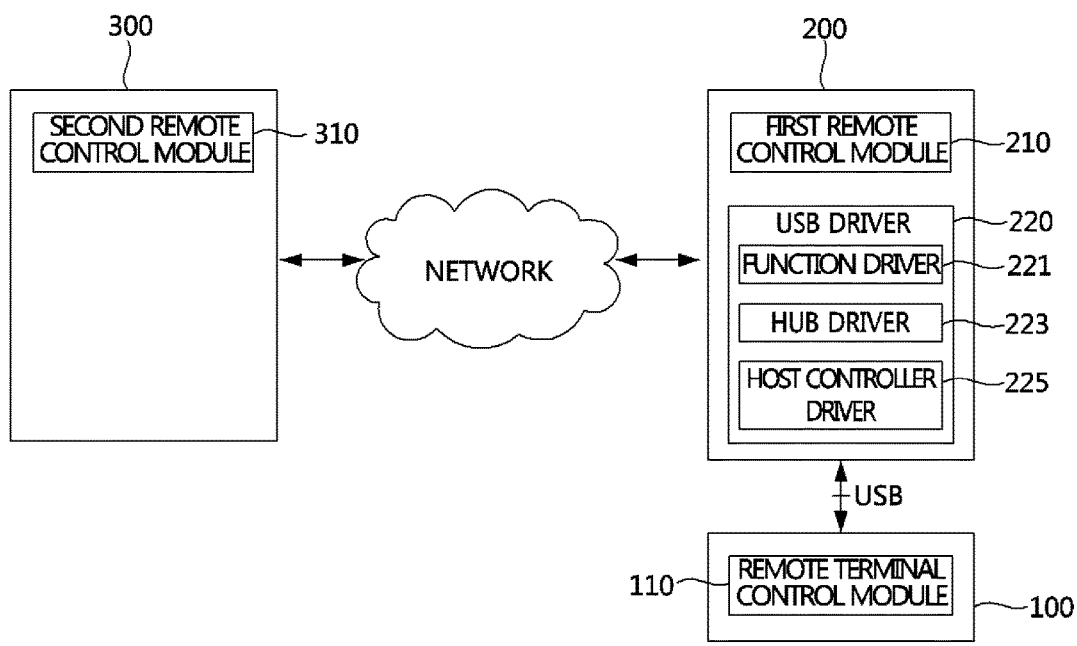
FIG. 2 shows function blocks of a USB device remote control system according to an example embodiment of the present invention.

FIG. 2 shows function blocks of a USB device remote control system according to an example embodiment of the present invention.

Referring to FIG. 2, the remote control system includes a mobile terminal 100 which is a remote control target, a first device 200 connected with the mobile terminal 100 through USB, and a second device 300 which is a control device connected with the first device via a network and performing remote control.

The first device 200 includes a first remote control module 210 and a USB driver 220.

The first remote control module 210 may be installed in the first device 200 through various methods. For example, a user of the first device 200 may download and install the first remote control module 210 by accessing a specific server according to an instruction of a counselor contacted via telephone, or by clicking a link address of the specific server included in a received email or text message.

When the mobile terminal 100 is connected to the first device 200 through USB, the first remote control module 210 receives an interrupt indicating that the mobile terminal 100 has been connected from a hub driver 223. Subsequently, the first remote control module 210 receives device information (e.g., a vendor ID and a product ID) on the mobile terminal 100 provided from the hub driver 223, and then determines whether a function driver 221 of the mobile terminal 100 is in the first device 200 on the basis of the received device information.

Here, the first remote control module 210 may provide the device information on the mobile terminal 100 to an OS of the first device 200, and the OS may be configured to determine whether there is the function driver 221 of the mobile terminal 100 by comparing the device information with registry information stored in the first device 200, and load the function driver 221 into a memory when there is the function driver 221 of the mobile terminal 100. On the other hand, when the function driver 221 of the mobile terminal 100 is not in the first device 200, the first remote control module 210 may receive information on the function driver 221 from the OS of the first device 200 to determine whether or not there is the function driver 221.

When it is determined that the function driver 221 corresponding to the mobile terminal 100 is not in the first device 200, the first remote control module 210 may access a predetermined device driver server using predetermined address information to download and install the function driver 221, or may access the server of the corresponding manufacturer using the device information provided from the mobile terminal 100 to download and install the function driver 221. Alternatively, after transmitting the device information received from the mobile terminal 100 to a second remote control module 310 of the second device 300 via the network, the first remote control module 210 may receive the function driver 221 from the second remote control module 310 via the network and install the received function driver 221.

When the USB driver 220 for driving the mobile terminal 100 is installed on the first device 200 as described above, the first remote control module 210 provides a remote terminal control module 110 to the mobile terminal 100 through the USB driver 220. Here, the first remote control module 210 may receive the remote terminal control module 110 from the second remote control module 310 via the network, and then provide the received remote terminal control module 110 to the mobile terminal 100 through the USB driver 220 in response to control of the second remote control module 310.

The remote terminal control module 110 may be configured to be installed in the mobile terminal 100 when the first remote control module 210 is installed in the first device 200. To this end, the first remote control module 210 may include the remote terminal control module 110 and may be configured to install the remote terminal control module 110 in the mobile terminal 100.

Here, the remote terminal control module 110 and the first remote control module 210 may be configured in the form of a package so as to be simultaneously downloaded when the first remote control module 210 is downloaded from the specific server to the first device 220.

Alternatively, the remote terminal control module 110 may be configured to be downloaded from the specific server and then provided to the mobile terminal 100 after the first remote control module 210 is installed in the first device 200.

Alternatively, after the USB driver 220 of the mobile terminal 100 is installed in the first device 200 as described above, the remote terminal control module 110 may be manually installed in the mobile terminal 100 by the user.

The first remote control module 210 provides a command for executing the remote terminal control module 110 stored in the mobile terminal 100 to the mobile terminal 100 through the USB driver 220 in response to control of the second remote control module 310, and the mobile terminal 100 executes the stored remote terminal control module 110 in response to the command.

Here, the first remote control module 210 may control execution of the remote terminal control module 110 by itself without depending on control of the second remote control module 310.

The remote terminal control module 110 executed in the mobile terminal 100 may capture and provide a display image currently displayed on the mobile terminal 100 to the first remote control module 210 through the USB driver 220, and the first remote control module 210 may provide the display image provided from the mobile terminal 100 to the second remote control module 310 of the second device 300 via the network.

The first remote control module 210 may display the display image provided from the mobile terminal 100 on the first device 200 only without providing the display image to the second remote control module 310, or may transmit the display image of the mobile terminal 100 to the second remote control module 310 via the network while displaying the display image. Also, the first remote control module 210 may only perform a transfer function of transmitting the display image of the mobile terminal 100 to the second device 300 without directly displaying the display image on the first device 200, or may display the display image of the mobile terminal 100 on the first device 200 and capture and transmit a display image of the first device 200 in which the displayed display image of the mobile terminal 100 is shown to the second device 300. Alternatively, the mobile terminal 100 may be configured to directly transmit the captured display image of the mobile terminal 100 to the second device 300 using a mobile communication network, a wireless communication network, etc. separately from the first device 200.

Here, the remote terminal control module 110 of the mobile terminal 100 may capture and provide a display image to the first remote control module 210 at predetermined time intervals or only when there is a change in a screen. Also, the remote terminal control module 110 of the mobile terminal 100 may compare a captured image with a previously captured image and only provide a difference between the two images to the first remote control module 210. The first remote control module 210 may capture and provide a display image to the second device 300 at predetermined time intervals or only when there is a change in a screen of the first device 200 and/or there is a change in a display image of the mobile terminal 100 displayed on the first device 200. Also, the first remote control module 210 may compare a captured image with a previously captured image and only provide a difference between the two images to the second device 300.

The device driver 220 may include the function driver 221, the hub driver 223 and a host controller driver 225.

The function driver 221 (or a client driver) manages communication between the first remote control module 210 in its upper layer and the hub driver 223 in its lower layer. The function driver 221 may be configured as at least one file, and may be, for example, a class driver provided by the manufacturer of the mobile terminal 100. The class driver manages communication limited to the mobile terminal 100 or a class of the mobile terminal 100. The function driver 221 and the hub driver 223 may communicate with each other using a separately prepared format (e.g., an input/output (I/O) request packet).

The hub driver 223 is a driver that manages communication with a system hub of the first device 200. When the mobile terminal 100 is connected to the first device 200, the hub driver 223 receives an interrupt indicating that the mobile terminal 100 has been connected from the host controller driver 225 in its lower layer, establishes a temporary communication path with an endpoint of the mobile terminal 100 by setting a pipe in response to the interrupt, and then transmits a signal requesting device information to the mobile terminal 100 through the host controller driver 225. Subsequently, the hub driver 223 receives device information on the mobile terminal 100 from the host controller driver 225 in its lower layer, and provides the received device information to the first remote control module 210.

The host controller driver 225 manages communication between the hub driver 223 and host controller hardware (not shown) connected to a hub. In other words, the host controller driver 225 transfers data provided from the hub driver 223 to the host controller hardware. Then, the data is transferred to a hub to which the mobile terminal 100 is physically connected, and the hub hands the data over to the mobile terminal 100. Also, data provided from the mobile terminal 100 to the hub is provided to the host controller driver 225 through the host controller hardware connected with the hub, and the host controller driver 225 transfers the received data to the hub driver 223 in its upper layer.

The second device 300 includes the second remote control module 310 that performs remote control of the mobile terminal 100 connected to the first device 200.

When the USB driver 220 for driving the mobile terminal 100 is installed on the first device 200, the second remote control module 310 provides the remote terminal control module 110 to the mobile terminal 100 through the first remote control module 210 to store the remote terminal control module 110 in the mobile terminal 100, and then provides a command for executing the remote terminal control module 110 stored in the mobile terminal 100 to the first remote control module 210, such that the remote terminal control module 110 can be executed in the mobile terminal 100.

Also, the second remote control module 310 receives a display image of the mobile terminal 100 transmitted from the first remote control module 210 via the network or a captured display image of the first device 200 including the display image of the mobile terminal 100, and then displays the received display image. Alternatively, when a captured display image of the mobile terminal 100 is directly transmitted from the mobile terminal 100 via the mobile communication network, the wireless communication network, etc., the second remote control module 310 may receive and display the captured display image.

When the display image of the mobile terminal 100 is displayed in this way, a counselor may control the mobile terminal 100 at a remote location while looking at the displayed display image of the mobile terminal 100 or the display image of the first device 200 including the display image of the mobile terminal 100. When a control instruction for controlling the mobile terminal 100 is provided from the counselor, the second remote control module 310 transmits a control command and/or data to the first remote control module 210 in response to the control instruction. This process is repeated while remote control is being performed.

When an event instructing finish of remote control of the mobile terminal 100 occurs, the second remote control module 310 transmits a command for finishing remote control and/or a command for finishing execution of the remote terminal control module 110 that is being executed in the mobile terminal 100 to the first remote control module 210. Here, when remote control of the mobile terminal 100 is finished, the second remote control module 310 may transmit a command for removing the remote terminal control module 110 stored in the mobile terminal 100 to the first remote control module 210.

When the network connection between the first device 200 and the second device 300 is abnormally terminated due to an unstable network environment or malfunction of the second device 300 or the first device 200, the first remote control module 210 may provide a command for removing the remote terminal control module 110 to the mobile terminal 100, and the mobile terminal 100 may remove the remote terminal control module 110 on the basis of the removal command provided from the first remote control module 210.

FIG. 3 is a flowchart illustrating a USB device remote control method according to an example embodiment of the present invention.

Referring to FIG. 3, a first device 200 determines whether a mobile terminal 100 is connected through USB (step 401). When it is determined that the mobile terminal 100 is connected, the first device 200 provides a device information request signal to the mobile terminal 100 and receives device information including a vendor ID and a product ID from the mobile terminal 100.

Subsequently, the first device 200 determines whether or not there is a function driver corresponding to the mobile terminal 100 on the basis of the received device information (step 403). When it is determined that there is not the function driver corresponding to the mobile terminal 100, the first device 200 obtains the function driver of the mobile terminal 100 (step 405). Here, the first device 200 may access a predetermined device driver server using predetermined address information to download the function driver, or may access a server of the corresponding manufacturer using the device information provided from the mobile terminal 100 to download the function driver. Also, the first device 200 may transmit the device information received from the mobile terminal 100 to a second device 300 via a network, and receive the function driver provided from the second device 300.

After obtaining the function driver of the mobile terminal 100 as described above, the first device 200 installs the obtained function driver (step 407).

When the function driver of the mobile terminal 100 is installed on the first device 200 through steps 403 to 407, the second device 300 provides a remote terminal control module for remote control of the mobile terminal 100 to the mobile terminal 100 through the first device 200 (step 409), and the mobile terminal 100 receives and stores the remote terminal control module transmitted from the second device 300 through the first device 200 (step 411).

By way of example, it has been described above that in steps 409 and 411, the second device 300 provides the remote terminal control module to the first device 200, and the first device 200 provides the received remote terminal control module to the mobile terminal 100. However, in other example embodiments of the present invention, the remote terminal control module may be configured to be installed in the mobile terminal 100 when a first remote control module is installed in the first device 200, or to be manually installed in the mobile terminal 100 by a user.

Subsequently, the second device 300 provides a command for executing the remote terminal control module stored in the mobile terminal 100 to the first device 200 (step 413), and the first device 200 provides the command to the mobile terminal 100 through a USB driver including the function driver.

The mobile terminal 100 executes the stored remote terminal control module in response to the command for executing the remote terminal control module (step 415).

Subsequently, the remote terminal control module executed in the mobile terminal 100 captures and provides a display image currently displayed on the mobile terminal 100 to the first device 200 (step 417), and the first device 200 provides the display image provided from the mobile terminal 100 to the second device 300 via the network. Here, the first device 200 may transmit the display image provided from the mobile terminal 100 to the second device 300 while directly displaying the display image, or may display the display image of the mobile terminal 100 and then capture and transmit a whole display image in which the display image of the mobile terminal 100 is shown to the second device 300. Alternatively, the first device 200 may display the display image provided from the mobile terminal 100 on the first device 200 only without providing the display image to the second device 300, or may only perform a transfer function of transmitting the display image of the mobile terminal 100 to the second device 300 without directly displaying the display image on the first device 200. Alternatively, the mobile terminal 100 may be configured to directly transmit the captured display image of the mobile terminal 100 to the second device 300 using a mobile communication network, a wireless communication network, etc. separately from the first device 200.

The second device 300 receives and displays the display image of the mobile terminal 100 or the display image of the first device 200, in which the display image of the mobile terminal 100 is shown, transmitted from the first device 200 (step 419). Subsequently, when a counselor provides a command for controlling the mobile terminal 100 while looking at the displayed display image of the mobile terminal 100 or the display image of the first device 200 including the display image of the mobile terminal 100, the second device 300 transmits the command to the first device 200 (step 421), and the first device 200 provides the command for the mobile terminal 100 provided from the second device 300 to the mobile terminal 100 through the USB driver.

The mobile terminal 100 executes the command provided from the first device 200 (step 423), and then captures and transmits a display image showing the command execution result to the first device 200 (step 425). The first device 200 transmits the display image provided from the mobile terminal 100 to the second device 300 via the network. Here, the first device 200 may transmit the display image provided from the mobile terminal 100 to the second device 300 while directly displaying the display image, or may display the display image of the mobile terminal 100 and then capture and transmit a whole display image of the first device 200 in which the display image of the mobile terminal 100 is shown to the second device 300. Alternatively, the first device 200 may display the display image provided from the mobile terminal 100 on the first device 200 only without providing the display image to the second device 300, or may only perform the transfer function of transmitting the display image of the mobile terminal 100 to the second device 300 without directly displaying the display image on the first device 200. Alternatively, the mobile terminal 100 may be configured to directly transmit the captured display image of the mobile terminal 100 to the second device 300 using the mobile communication network, the wireless communication network, etc. separately from the first device 200.

The second device 300 receives and then displays the display image of the mobile terminal 100 or the display image of the first device 200 including the display image of the mobile terminal 100 (step 427).

Steps 421 to 427 may be repeated while remote control is being performed.

The second device 300 determines whether an instruction for finishing remote control is provided from the counselor (step 429). When the instruction for finishing remote control is provided, the second device 300 provides a command for finishing the remote terminal control module that is being executed in the mobile terminal 100 to the mobile terminal 100 through the first device 200 (step 431).

When the command for finishing the remote terminal control module is provided, the mobile terminal 100 finishes execution of the remote terminal control module that is being executed (step 433).

Here, the command for finishing the remote terminal control module may be provided from the user of the first device 200. In this case, the first device 200 may directly provide the command for finishing the remote terminal control module to the mobile terminal 100.

When remote control is finished, the second device 300 or the first device 200 may provide a command for removing the remote terminal control module installed in the mobile terminal 100 to the mobile terminal 100, and the mobile terminal 100 may remove the installed remote terminal control module in response to the command.

When the network connection between the first device 200 and the second device 300 is abnormally terminated due to an unstable network environment or malfunction of the second device 300 or the first device 200, the first device 200 may provide a command for removing the remote terminal control module installed in the mobile terminal 100 to the mobile terminal 100, and the mobile terminal 100 may remove the remote terminal control module on the basis of the removal command provided from the first device 200.

In the above-described USB device remote control method and the above-described system for performing the method, when a mobile terminal is connected to a first device through USB, device information on the mobile terminal is obtained, and a function driver of the mobile terminal is installed using the obtained device information on the mobile terminal. Then, a second device present at a remote location transmits a command and/or data for controlling the mobile terminal to the first device via a network, and the first device provides the command and/or data to the mobile terminal through the device driver. Also, the mobile terminal captures and transmits the execution result data or a display image to the second device at the remote location through the first device, and the second device displays the received display image of the mobile terminal.

Consequently, it is possible to control a mobile terminal at a remote location via a network, thereby readily diagnosing or fixing trouble of a mobile terminal, upgrading software/firmware, and installing a program without direct intervention of a user of the mobile terminal.

While the example embodiments of the present invention and their advantages have been described in detail, it should be understood that various changes, substitutions and alterations may be made herein without departing from the scope of the invention.

What is claimed is:

1. A Universal Serial Bus (USB) device remote control method in a remote control system including a first device connected with a terminal through the USB and a second device connected with the first device via a network, the method comprising:
    after the first device is connected with the terminal through the USB, determining, at the first device, whether or not there is a function driver of the terminal based on device information provided from the terminal;
    when there is no function driver of the terminal, acquiring the function driver of the terminal;
    installing, at the first device, the function driver of the terminal;
    transmitting, at the second device and to a predetermined server, a remote terminal control module to the first device via the network;
    transmitting, at the first device, the remote terminal control module to the terminal using a USB driver;
    transmitting, at the second device, a control command for executing the remote terminal control module to the first device, and transmitting, at the first device, the control command for executing the remote terminal control module to the terminal using the USB driver;
    receiving, at the first device and from the terminal, a first captured image when the terminal executes the control command, wherein the first captured image is a first image displayed on the terminal according to the execution result;
    transmitting, at the first device, the first captured image to the second device;
    displaying, at the second device, a received one of the first captured image of the terminal and a captured display image of the first device; and
    receiving, at the first device and from the terminal, a second captured image,
        wherein the second captured image is a second image displayed on the terminal according to the execution result, and
        wherein the second captured image is received from the terminal when the second captured image is different from the first captured image.

2. The USB device remote control method of claim 1, wherein acquiring the USB driver includes:
    accessing, at the first device, a specific server and downloading the function driver; and
    installing, at the first device, the downloaded function driver.

3. The USB device remote control method of claim 1, wherein acquiring the USB driver includes:
    transmitting, at the first device, the device information provided from the terminal to the second device via the network;
    transmitting, at the second device, the function driver of the terminal corresponding to the device information to the first device; and
    installing, at the first device, the function driver received from the second device.

4. The USB device remote control method of claim 1, wherein transmitting, at the first device, the first captured image to the second device includes:
    displaying, at the first device, the first captured image on the first device;
    capturing, at the first device, a display image, corresponding to the first captured image, of the first device in which the first captured image is shown; and
    transmitting, at the first device, the captured display image of the first device to the second device.

5. The USB device remote control method of claim 1, further comprising, after displaying, at the second device, a first display image:
    transmitting, at the second device, a command for finishing remote control of the terminal to the terminal through the first device; and
    wherein the terminal finishes execution of the remote terminal control module in response to the command for finishing remote control.

6. A remote control system, comprising:
    a first remote control module installed in a first device connected with a terminal through Universal Serial Bus (USB), and configured to determine whether or not there is a function driver of the terminal based on device information provided from the terminal and, when a function driver of the terminal is not in the first device, acquire the function driver of the terminal and install the function driver according to a predetermined method and communicate with the terminal through the function driver; and
    a second remote control module installed in a second device connected with the first device via a network, and configured to transmit a control command for executing a remote terminal control module to the terminal through the first remote control module by performing communication with the first remote control module, receive a first captured image displayed on the terminal according to executing of the control command through the first remote control module and display a received one of the first captured image of the terminal and a captured display image of the first device,
    wherein the second remote control module transmits the remote control module for remote control of the terminal to the first remote control module, and the first remote control module transmits the remote terminal control module to the terminal,
    wherein the first remote control module receives a second captured image from the terminal according to the execution result, and
    wherein the first remote control module transmits the second captured image to the second remote control module when the second captured image is different from the first captured image.

7. The remote control system of claim 6, wherein the first remote control module accesses a specific server to download and install the function driver when the function driver is not in the first device.

8. The remote control system of claim 6, wherein the first remote control module when the function driver is not in the first device, transmits the device information of the terminal to the second remote control module and installs the function driver provided from the second remote control module.

9. The remote control system of claim 6, wherein the first remote control module displays the first captured image of the terminal on the first device and transmits the first captured image to the second remote control module.

10. The remote control system of claim 6, wherein the first remote control module displays the first captured image of the terminal on the first device, captures a first display image of the first device in which the first captured image of the terminal is shown, and transmits the first captured display image, corresponding to the first captured image, of the first device to the second remote control module.

* * * * *